United States Patent
Hans et al.

(10) Patent No.: US 9,807,595 B2
(45) Date of Patent: Oct. 31, 2017

(54) TERMINAL READ WITH SMART CARD UPDATE LIST

(71) Applicant: ORACLE INTERNATIONAL CORPORATION, Redwood Shores, CA (US)

(72) Inventors: Sebastian J. Hans, Berlin (DE); Alexander Glasman, St. Petersburg (RU)

(73) Assignees: ORACLE INTERNATIONAL CORPORATION, Redwood Shores, CA (US); ORACLE DEUTSCHLAND B.V. & CO. KG, Munich (DE)

( * ) Notice: Subject to any disclaimer, the term of this patent is extended or adjusted under 35 U.S.C. 154(b) by 12 days.

(21) Appl. No.: 14/326,495

(22) Filed: Jul. 9, 2014

(65) Prior Publication Data
US 2016/0014594 A1 Jan. 14, 2016

(51) Int. Cl.
*H04W 8/18* (2009.01)
*H04W 8/20* (2009.01)

(52) U.S. Cl.
CPC ........... *H04W 8/183* (2013.01); *H04W 8/205* (2013.01)

(58) Field of Classification Search
CPC .............................. H04W 8/183; H04B 1/3816
See application file for complete search history.

(56) References Cited

U.S. PATENT DOCUMENTS

| | | | |
|---|---|---|---|
| 6,968,209 B1 * | 11/2005 | Ahlgren | G06F 21/64 370/350 |
| 8,607,050 B2 | 12/2013 | Hans et al. | |
| 2007/0126562 A1 * | 6/2007 | Ku | B60R 25/24 340/426.28 |
| 2010/0093396 A1 * | 4/2010 | Roundtree | H04M 1/72522 455/558 |
| 2012/0108294 A1 * | 5/2012 | Kaul | G06K 7/0013 455/558 |
| 2013/0344857 A1 * | 12/2013 | Berionne | H04W 88/02 455/418 |

FOREIGN PATENT DOCUMENTS

WO    WO 2014131785 A1 *    9/2014    ........... H04W 4/001

* cited by examiner

*Primary Examiner* — Kashif Siddiqui
*Assistant Examiner* — Minjung Kim
(74) *Attorney, Agent, or Firm* — Cooper Legal Group, LLC (57) ABSTRACT

Systems, methods, and other embodiments associated with terminal reading using an update list are described. In one embodiment, a method includes identifying request to modify an object having corresponding data stored on a smart card installed in a terminal; storing an object identifier for the object in an update list; modifying the data corresponding to the object per the instruction; and providing the update list for access by the terminal. In another embodiment, the method may also include receiving a card read command; accessing an update list; identifying one or more objects in the update list; and reading data corresponding to the one or more objects, such that data corresponding to objects in the set of objects that are not in the update list are not read.

20 Claims, 6 Drawing Sheets

TERMINAL READ WITH SMART CARD UPDATE LIST

Smart cards are self contained, often card sized and/or removable, memory devices designed to be installed in and powered by a terminal, such as a mobile communication device. A smart card includes memory that typically stores confidential information that is unique to the owner (e.g., cell phone service subscriber) of the smart card. The smart card also includes a processor that manages access to the contents of the smart card in order to protect the security of the smart card data. This managed access distinguishes smart memory devices or smart cards from many other memory devices. When used in a mobile device, the smart card processor performs cryptographic computations to support network authentication. In many cases the smart card processor can run smart card based applications. A smart card may also include hardware that supports communication so that the contents of the smart card can be manipulated wirelessly by authenticated remote devices.

Smart cards have on-card dynamic data processing capabilities. Multifunction smart cards allocate card memory into independent sections or files assigned to a specific function or application. Within the card is a processor that manages this memory allocation and file access. The processor manages data in organized file structures, via a card operating system (COS). The COS controls access to the on-card user memory, thus enabling secure identification of users. There are many configurations smart card processors, including processors that support cryptographic Public Key Infrastructure (PKI) functions with on-board math co-processors or JavaCard® with virtual machine hardware blocks.

Smart-cards can authenticate identity. Usually, smart card processors employ a public key infrastructure (PKI). The smart card stores an encrypted digital certificate issued from the PKI provider along with other relevant information. Cryptographic smart cards are often used for single sign-on. Most advanced smart cards include specialized cryptographic hardware that uses algorithms such as RSA and DSA. Cryptographic smart cards generate key pairs on board, to avoid the risk from having more than one copy of the key (since by design there usually isn't a way to extract private keys from a smart card). Such smart cards are mainly used for digital signatures and secure identification.

One common type of smart card is the Universal Integrated Circuit Card (UICC), which is used in mobile devices that communicate in mobile cellular networks (e.g., Global System for Mobile Communications (GSM), Universal Mobile Telecommunications System (UMTS)). A UICC may sometimes be referred to as a Subscriber Identify Module Card or "SIM card." The UICC stores the personal information of the account holder, including his or her phone number, address book, text messages, and other data. Depending on the intended use of the mobile terminal, the UICC runs a SIM application or a Universal SIM (USIM) application that manages access to the user's personal information stored in the UICC. The SIM application is configured to communicate within a GSM network while the USIM application is configured to communicate within a UMTS network. Other applications include CDMA SIM (CSIM) for use in code division multiple access (CDMA) networks. Many UICCs include both a SIM and USIM application and sometimes also a CSIM application. When a user wants to change mobile devices, he or she can usually remove the UICC card from one handset and insert the card into another handset. UICC cards are convenient and popular with many users, and are a key part of developing mobile device technology.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Various embodiments are provided herein with reference to example UICC technology; however, these embodiments are generally applicable to smart memory devices regardless of their type. A smart card or UICC may be removable from a host terminal, which is a hardware device that operates, via an interface, on top of the UICC (such as a mobile device). However, smart card technology also includes "embedded" smart cards or "eUICCs" that are physically integrated with the host terminal's hardware but still operate via the interface to the eUICC. As mobile technology has evolved, mobile devices are increasingly used by a single individual throughout the mobile device's lifetime. Further, in the machine-to-machine communication sector an individual human user is not involved, eliminating the need to make personal data portable. This means that UICCs are rarely removed from the terminal in which they are installed. Having an embedded smart card frees up valuable space within the terminal because it eliminates the hardware interface for a removable smart card. Embedded smart cards also prevent the user from removing the smart card from the terminal, which may or may not be supported depending on the implementation.

Regardless of whether the smart card is embedded, the host terminal may operate with the smart card to provide additional functionality, capability, or service than is offered by the smart card alone, but that may depend on further information from the smart card to unlock this additional functionality, capability, or service. For example, a smart phone might not be able to authenticate with a service tower without access to valid authentication information retrieved from a SIM card that has been registered with a service provider that uses the tower.

The basic design approach of the operating system and the applications in a smart card assumes that the terminal will read data from a smart card each time a smart card is installed in the terminal. Because terminals were designed with the intent that smart cards would often be changed, many processes of the terminal include a card read operation in which the entire contents of the smart card memory are read from the card and overwritten in terminal memory. For example, the boot process of the terminal, which is invoked upon every terminal power up or reset, includes the card read operation. Any time the terminal boots the card read operation is performed, resulting in a reading and overwriting of smart card data that is stored in the terminal. Recent analysis has shown that the reading of the data from a UICC is becoming the most time consuming part of the boot process for mobile devices.

As smart cards become more complex, it may no longer be sufficient for the terminal to reload data from the smart card only upon boot. Data in smart cards can be wirelessly (e.g., contactlessly) modified during operation of the terminal. Applications running in the smart card may internally alter data that is used by the terminal for some purpose, and so on. When data changes in the smart card, the smart card triggers a refresh process for the terminal, which results in the terminal performing the card read operation in which the entire contents of the smart card are read by the terminal rather than just the data that has changed.

When a smart card has not been removed from a terminal since the last card read operation, it is unnecessary for the terminal to read the entire contents of the smart card during the next boot or refresh process. This means that in the majority of cases, the time spent and the power consumed by reading the contents of the smart card during boot and refresh processes is not necessary.

Systems and methods are described herein that provide a selective card read operation that reads data on a smart card only for objects or files that have been updated since a last card read operation. To support this selective card read operation, an update list is maintained by the smart card that identifies all objects (e.g., JAVA objects or files) that have been modified since the last time the card read operation occurred. The card read operation of the terminal, which is invoked by the boot process, the refresh process, or other process is configured to identify objects in the update list and to read data only for those objects. In many cases, when the smart card has not been removed from the terminal, very few, if any objects will have been modified since the last card read operation. Using the update list, the terminal only reads data for the modified objects, saving time and reducing power consumption.

Figure 1:
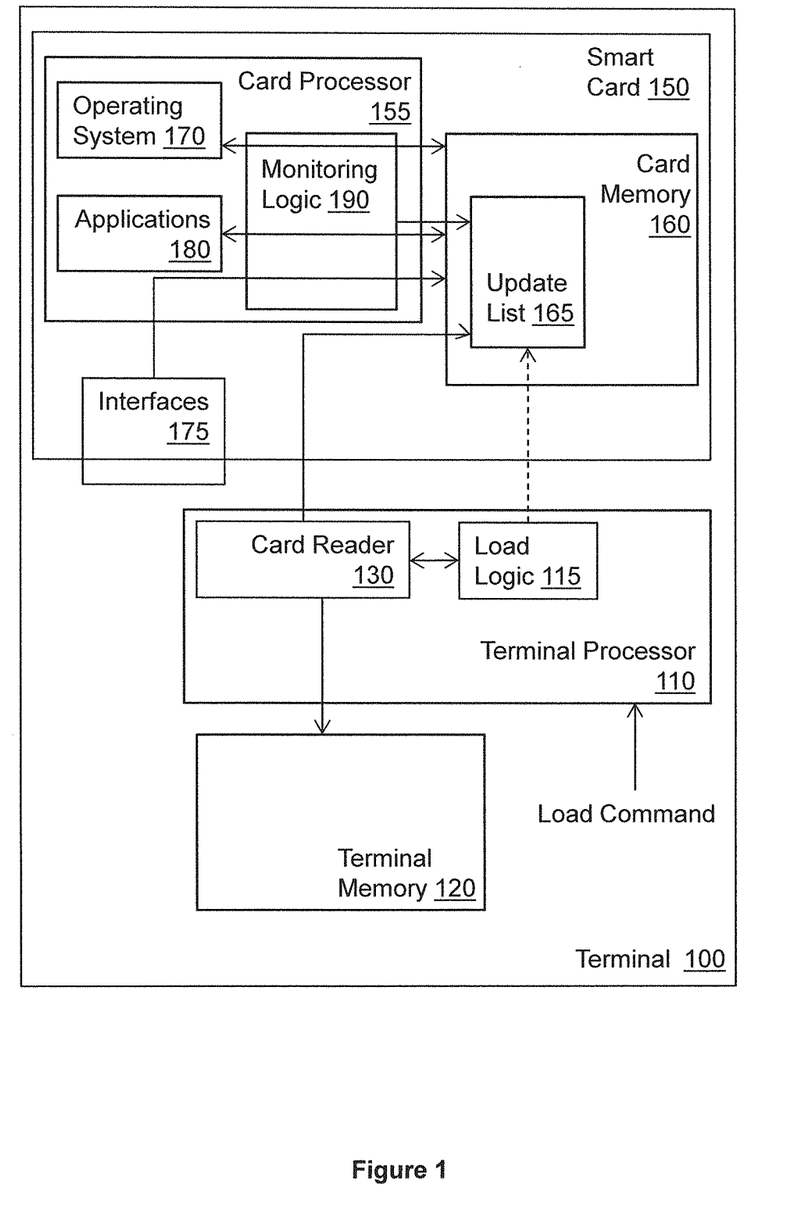
FIG. 1 illustrates one embodiment of a system associated with terminal reading using smart card update list.

With reference to FIG. 1, one embodiment of a terminal 100 that selectively reads data from a smart card 150 based on an update list 165 is illustrated. For the sake of simplicity, in some examples herein the terminal 100 and smart card 150 will be described in the context of a cell phone in which a UICC card is installed. It is to be understood that the selective reading technique described herein can be used to improve the operation of any terminal that periodically reads data from a smart card.

The terminal 100 includes a terminal processor 110 and terminal memory 120. Of course, depending on the purpose of the terminal 100, the terminal may include communication hardware, additional specialized processors, and/or special purpose memory such as FLASH memory for storing images. The terminal processor includes a card reader 130 that is configured to read data from card memory 160 and store the data in the terminal memory 120. The card reader 130 may be implemented using hardware, software, or a combination of hardware and software. A load logic 115 is configured to, in response to a read command, access the update list 165, control the card reader 130 to read data for the objects in the update list 165, and store the data in the card memory 160.

The smart card 150 includes a card processor 155 and card memory 160. Of course, depending on the purpose of the terminal 100, the smart card 150 may include communication hardware, additional specialized processors, and/or security related components designed to perform encryption operations to protect data stored in the card memory 160. The card processor 155 runs an operating system 170 that controls the overall operation of hardware and software aspects of the smart card 150. The card processor 155 may also include an application platform (e.g., Java Card) that supports one or more applications 180.

As smart cards become more embedded in the terminal, the interface between the smart card and the terminal become more complex. Thus, the smart card 150 is connected via multiple interfaces 175 to various components of the terminal 100. Possible hardware interfaces, not shown in FIG. 1, include: a ETSI TS 102 221 interface to a GSM modem, Single Wire Protocol (SWP) interface to a Near Field Communication (NFC) front end, I2C interface used for eUICCs, and a SWP interface between secure elements in the smart card 150 and independent subparts of the terminal 100. Possible software interfaces between the smart card 150 and various layers of the terminal 100 include ISO 7816 APDU, HCI, and NCI. Another possible software interface includes software that handles network connectivity for the UICC, which relies on application protocol data units (APDUs) to alter data in the smart card while operating transparently with respect to the terminal.

Many different types of data are exposed on the interfaces between the smart card 150 and the terminal 100. For example, in the context of a mobile terminal and an embedded UICC, the interfaces expose file system data for the operation of a mobile terminal used to get into mobile networks and configure the mobile terminal accordingly for each mobile network. Contactless protocol parameters for different contactless applications are used to configure a contactless frontend in the terminal. The protocol parameters are shared with other elements of the mobile terminal to perform conflict detection among the different protocol parameters. Contactless application routing information especially for payment applications (e.g., proximity payment system environment (PPSE) table) is exposed so the NFC frontend of the terminal can target the correct application upon request of the contactless payment terminal.

If the smart card 150 cannot be removed from the terminal 100, that means that the data on the card cannot be changed by the card being removed and inserted in a different terminal. It follows that data read by the different elements in the terminal 100 will only be updated over communication interfaces that connect to the smart card 150. Further, when a new card is inserted in the terminal, the smart card's operating system and applications are aware of the new card. In other words, card data and update operations performed on them are always either occur under the control of the applications 180 running on the card or the card's operating system 170, which handles I/O over the interfaces 175. The smart card 150 includes monitoring logic 190 that monitors updates performed by the operation system 170 and the applications 180. By monitoring updates performed by the operating system 170 and the applications 180, the monitoring logic 190 can identify all possible update operations on the card's data.

As will be described in more detail with reference to FIGS. 2 and 3, the monitoring logic 190 populates the update list 165 with object identifiers for all objects that have been modified. For the purposes of this description, the term "object" will be used in a broad sense to refer to a collection of data that is considered as a unique entity by a component of the smart card 150 or the terminal 100. For example, an object may be a file that is manipulated by the operating system 170, a data object that is manipulated by an application 180 (e.g., a Java Card applet running on the smart card), and so on.

While a single monitoring logic and a single update list are shown in FIG. 1, it is to be understood that in some embodiments, multiple monitoring logics are used that are each dedicated to particular smart card applications, an operating system, and so on. In these embodiments, a global update list may be used that is populated by the multiple monitoring logics or each monitoring logic may maintain its own update list. In one embodiment, an update list can be made available for several applications by a trusted application (e.g., a GlobalPlatform Security Domain). The update list can be made available in different ways depending on where the update file resides or which security level is applicable to the object. Thus, the update list(s) can be maintained in a file of a global file system, an application level file system, or the update list can itself be a Java Card object.

Figure 2:
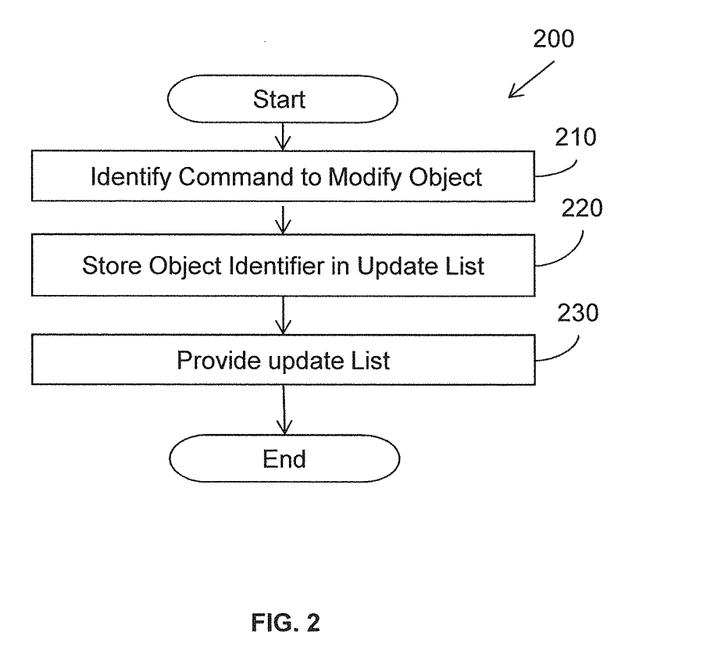
FIG. 2 illustrates one embodiment of a method associated with maintaining an update list.

FIG. 2 illustrates one embodiment of a method 200 associated with maintaining an update list (e.g., the update list 165 in FIG. 1). In some embodiments, the method 200 is performed by the monitoring logic 190 of FIG. 1 or monitoring/load logic 630 of FIG. 6. The method 200 includes, at 210, identifying request to modify an object having corresponding data stored on a smart card installed in a terminal. In one embodiment, the identifying is performed by determining if an instruction is in a stored list of modification instructions (e.g., WRITE, UPDATE, and so on) used by an operating system and all applications on the smart card. These instructions can be received from a smart card application, a smart card operating system, or a remote device communicating wirelessly by way of the terminal's NFC front end.

At 220, the method includes storing an object identifier for the object in an update list. Typically request to modify an object includes two instructions, a first instruction that selects the object and a second instruction that modifies the object. The object identifier is found in the second instruction. In some instances, the object identifier can be found in the modification instruction itself. At 230, the method includes providing the update list for access by the terminal. In one embodiment, the method 200 includes identifying an instruction from the terminal to read an object having an object identifier in the update list and deleting the object identifier from the update list when the data corresponding to the object is returned to the terminal.

In one embodiment, the method 200 includes detecting that the smart card is newly installed in the terminal and storing object identifiers for all objects stored in the smart card in the update list. In this manner, when a new card is installed in a terminal, all data on the terminal that originates with the smart card is read and overwritten in the terminal. In one embodiment, a response to a request from the load logic to read the update list includes a status word that indicates whether the update list is present. When the update list is not present, the entire contents of the smart card are read.

Figure 3:
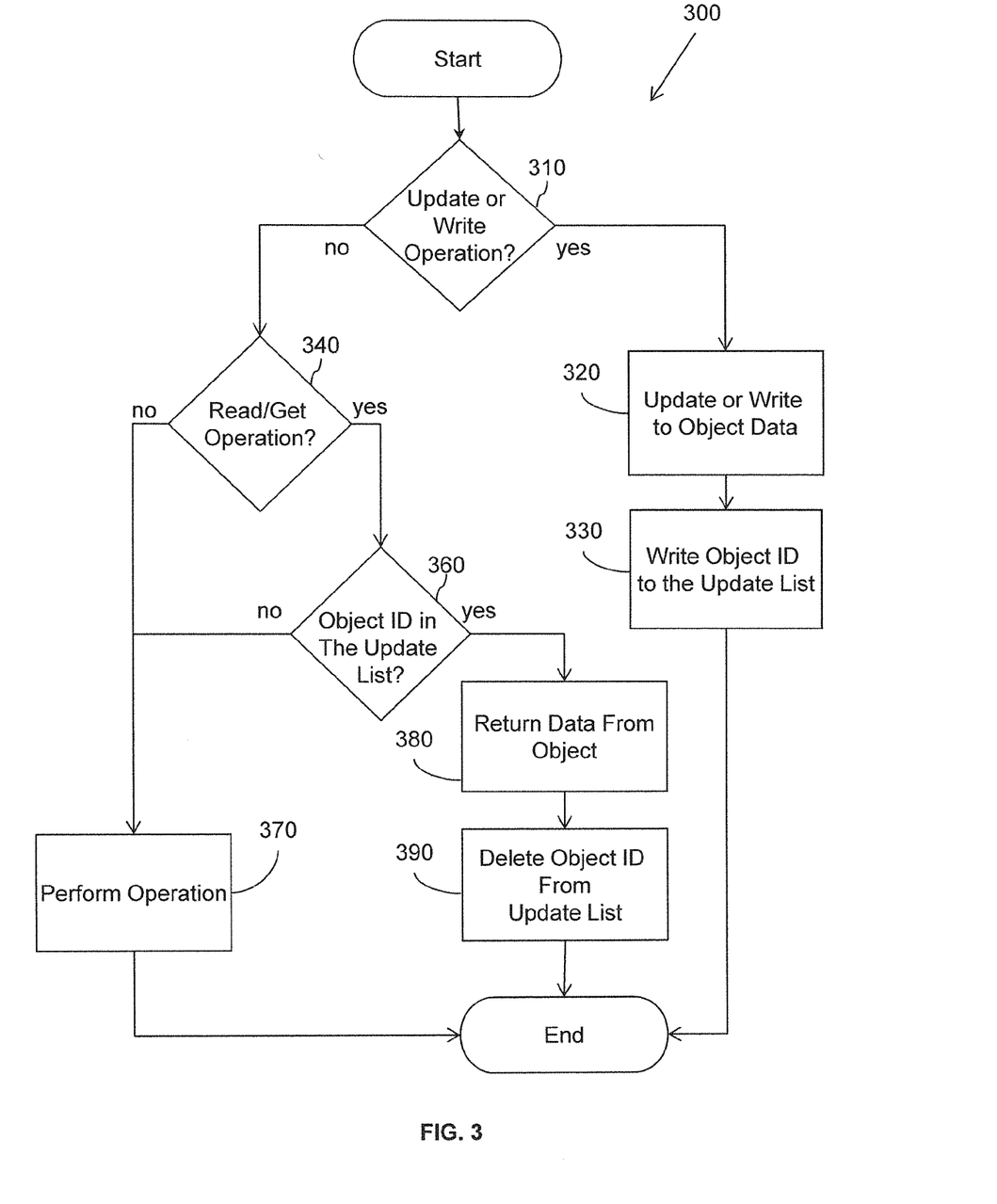
FIG. 3 illustrates one embodiment of a method associated with performing smart card operations using an update list.

FIG. 3 illustrates one embodiment of a method 300 that is performed by a smart card to maintain an update list. At 310, a determination is made as to whether an update or write operation is included in an instruction being executed by a component (e.g., operating system, application) of the smart card. If the instruction includes an update or write operation for an object, at 320 data corresponding to the object is updated or written. At 330, the object identifier for the object is added to the update list.

If the instruction does not include an update or write operation, at 340 a determination is made as to whether the instruction includes a read or get operation (e.g., any operation that stores data from the smart card in the terminal). If the instruction does not include a read or get operation, then at 370 the operation is performed without logging anything into the update list. If the instruction includes a read or get operation, at 380, the data for the object is returned to the terminal at 380 for storage in the terminal and at 390 the object identifier is deleted from the update list.

Returning to FIG. 1, the load logic 115 is configured to access the update list 165 when a card read command is received by the terminal processor 110. The card read command is executed to bring smart card data stored in a terminal into conformance with the corresponding smart card data on the smart card. For the purposes of this description, the term card read command refers to any command that causes data on the terminal 100 that originates in the smart card 150 to be read from the smart card 150 and overwritten in the terminal 100. Recall that in many existing devices, such a command would cause the entire contents of the smart card to be read and overwritten by the terminal, regardless of which, if any, data in the smart card had been modified since the last time the smart card data was read by the terminal.

Many different processes executed by the terminal and the smart card may include a card read command. Any process that includes a card read command is referred to generically herein as a card read operation. By way of example, the boot process includes a card read command as does the refresh process, which can be triggered by a REFRESH command issued by the smart card or a component of the terminal. Different terminal components (e.g., NFC front end) may trigger a card read operation when the module is powered up or reset (e.g., a modem module resets when airplane mode is exited in a cell phone). Smart card based applications (e.g., network access application (NAA)) may also issue a REFRESH command (e.g., each time a file is updated over-the-air). It can be seen that the card read command is issued fairly often and as such limiting the data that is read during each read operation saves a significant amount of time and reduces power consumption.

Figure 4:
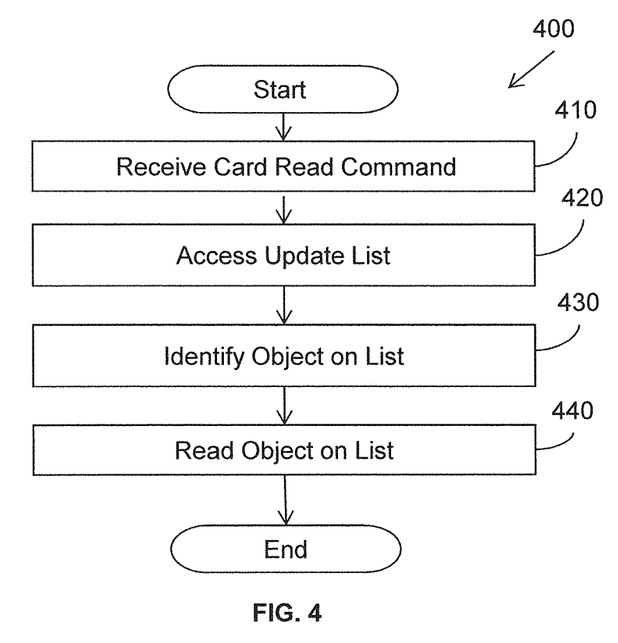
FIG. 4 illustrates an embodiment of a method associated with performing a card read operation based on an update list.
Figure 5:
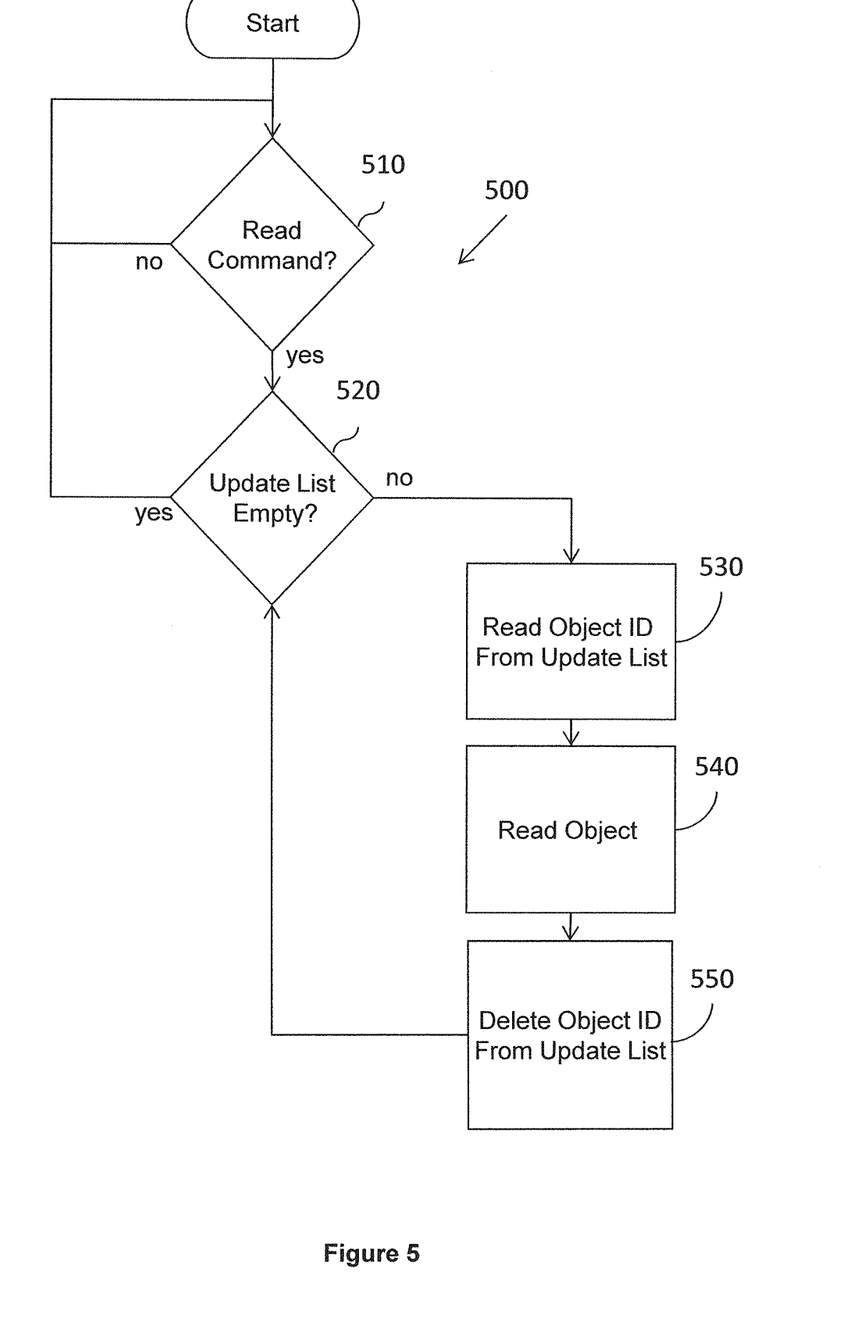
FIG. 5 illustrates another embodiment of a method associated with performing a card read operation based on an update list.

The load logic 115 guides the card reader 130 to read data only for those objects having object identifiers in the update list 165. Thus, in one sense, the load logic 115 adapts the terminal's response to a card read command by limiting the data that is read to data corresponding to objects on the update list. FIGS. 4 and 5 illustrate two embodiments of methods that can be used to guide the reading of smart card data by the card reader 130 based on an update list.

FIG. 4 illustrates one embodiment of a method 400 for selectively reading data from a smart card based on an update list. In some embodiments, the method 400 is performed by the load logic 115 of FIG. 1 or monitoring/load logic 630 of FIG. 6. The method 400 includes, at 410, receiving a load command. At 420, in response to the card read command, an update list is accessed. At 430, the method includes identifying one or more objects in the update list. At 440, the method includes reading data corresponding to the one or more objects, such that data corresponding to objects not in the update list are not read.

FIG. 5 illustrates one embodiment of a method 500 that can be performed by a terminal with a smart card to selectively read data from the smart card to the terminal in response to a card read command being received at 510. When a card read command is received, at 520 a determination is made as to whether or not the update list is empty. If the update list is empty, the method returns to 510 and waits for the next card read command. No data will be read from the smart card if the update list is empty. If the update list is not empty, at 530, an object identifier is read from the update list and at 540, data corresponding to the object is read and overwritten in the terminal. At 550, the object identifier is deleted from the update list and the method returns to 520 to determine if the update list includes another object identifier. Once all objects on the update list have been read and their corresponding identifiers deleted from the update list, the method returns to 510 to wait for the next card read command.

In one embodiment, an indication as to whether the update list is empty is given in return data when the Master File of the smart card is selected or in an answer to a reset of the smart card. A smart card application can return a list of update objects or an indication if there is a need to read an application level update list in data returned in a SELECT command.

In one embodiment, functionality to maintain the update list can be provided on a GlobalPlatform compliant card as a feature of the Security Domains (SD). The SD provide an API to smart card applications where the applications can flag updated objects for inclusion in the list and unmark them from the list when they are read by the terminal. The indication to retrieve the update list can be provided to the terminal when the terminal sets up a secure channel with the SD. The indication to retrieve the update list can also be provided in response to a SELECT command issued by the by SD when the SD establishes a secure channel.

When the smart card is connected via host controller interface (HCI) or NFC controller interface (NCI) to an NFC frontend, providing an update list will ease the maintenance of a routing table in the NFC frontend for different contactless services. The update list also helps to keep the routing table and the PPSE, which has to be provided to the contactless terminal, consistent among the different entities connected to the NEC frontend.

As can be seen from the foregoing description, providing an update list to guide the card read operation such that the terminal reads only selected data from a smart card can speed up many processes performed by the terminal and reduce power consumption.

Computer Embodiment

Figure 6:
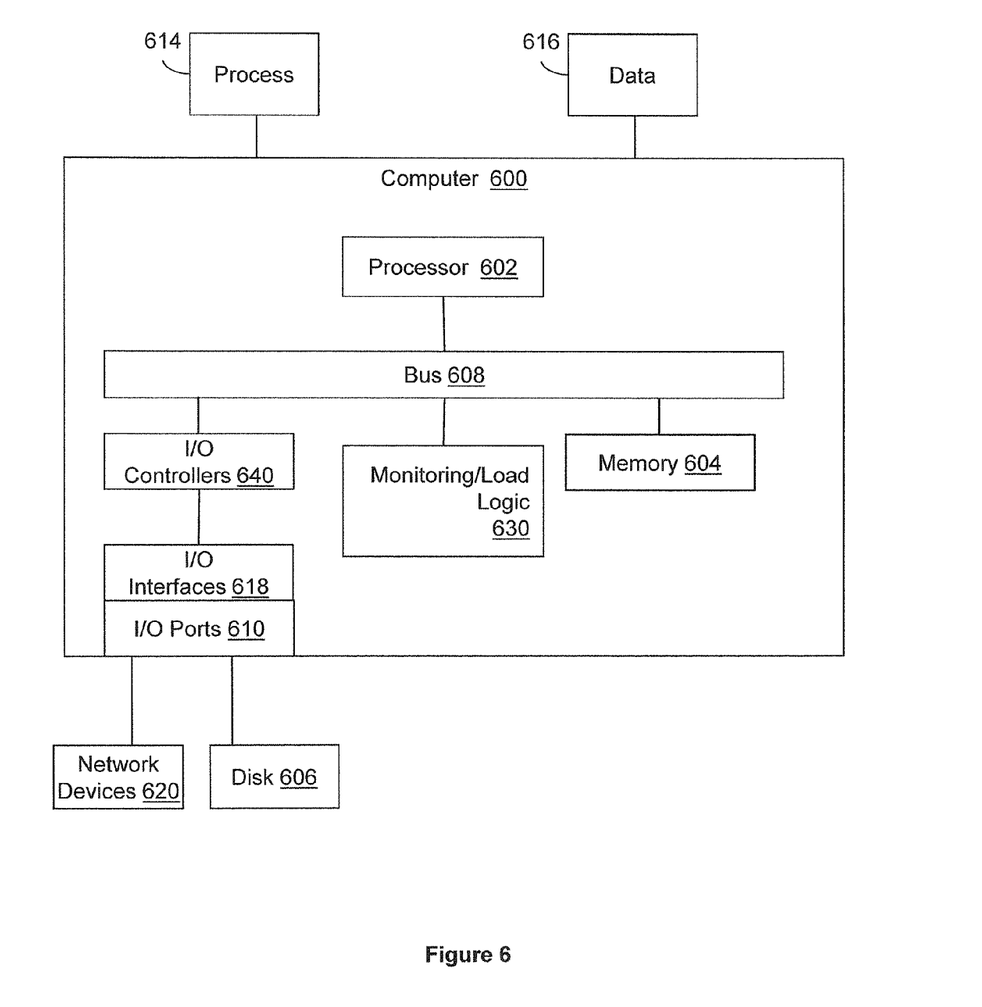
FIG. 6 illustrates an embodiment of a computing system configured with the example systems and/or methods disclosed.

FIG. 6 illustrates an example computing device or electronic device that is configured and/or programmed with one or more of the example systems and methods described herein, and/or equivalents. The example computing device may be a computer 600 that includes a processor 602, a memory 604, and input/output ports 610 connected by a bus 608. In one example, the computer 600 may include monitoring/load logic 630 configured to perform the functions of the monitoring logic 190 and/or the load logic 115 in FIG. 1. In one embodiment (not shown) one instance of the computer 600 is implemented on a smart card and includes a monitoring logic and another instance of the computer is implemented on a terminal and includes a load logic. The logic 630 may perform the monitoring methods described with reference to FIGS. 2 and 3 and/or the read methods described with reference to FIGS. 4 and 5. In different examples, the logic 630 may be implemented in hardware, a non-transitory computer-readable medium with stored instructions, firmware, and/or combinations thereof. While the logic 630 is illustrated as a hardware component attached to the bus 608, it is to be appreciated that in one example, the logic 630 could be implemented in the processor 602.

In one embodiment, logic 630 or the computer is a means (e.g., hardware, non-transitory computer-readable medium, firmware) for performing terminal reading with reference to an update list.

The means may be implemented, for example, as an ASIC programmed to maintain an update list. The means may also be implemented as stored computer executable instructions that are presented to computer 600 as data 616 that are temporarily stored in memory 604 and then executed by processor 602.

Logic 630 may also provide means (e.g., hardware, non-transitory computer-readable medium that stores executable instructions, firmware) for reading selected data from a smart card based on an update list.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

In another embodiment, the described methods and/or their equivalents may be implemented with computer executable instructions. Thus, in one embodiment, a non-transitory computer storage medium is configured with stored executable instructions that when executed by a machine (e.g., processor, electronic device, and so on) cause the machine (and/or associated components) to perform functions corresponding to the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C. §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C §101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C §101.

An "electronic connection" is one in which signals, physical communications, and/or logical communications may be sent and/or received. An electronic connection may include a physical interface, an electrical interface, and/or a data interface. An electronic connection may include differing combinations of interfaces and/or connections sufficient to allow control. For example, two entities can be electronically connected to communicate signals to each other directly or through one or more intermediate entities (e.g., processor, operating system, logic, non-transitory computer-readable medium). Logical and/or physical communication channels can be used to create an electronic connection.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory storage medium storing instructions that when executed by an electronic device, that includes a memory, and a smart card connected to the electronic device, cause the electronic device to:

in response to a boot process that is performed when the electronic device is powered on or restarted, invoking a card read command that is configured to read entire data contents from the smart card for loading into the memory;

in response to the card read command being invoked, controlling the card read command to limit data that is read that is a subset of the entire data contents from the smart card by:

accessing an update list stored on the smart card that indicates objects stored in the smart card that have been modified since a previous card read command was invoked;

identifying the objects from the update list that have been modified since the previous card read command was invoked;

executing the card read command to read the objects from the smart card that are identified in the update list without reading the entire data contents from the smart card; and deleting the objects from the update list after the card read command completes;

in response to determining that a first update or write operation for a first object is included in a first instruction executed by a first component of the smart card, adding an identifier of the first object to the update list; and in response to determining that a second update or write operation for a second object is included in a second instruction executed by a second component of the smart card, adding an identifier of the second object to a second update list stored on the smart card, wherein the update list is different than the second update list.

2. The non-transitory storage medium of claim 1, where the instructions are configured to cause the electronic device to: identify an instruction from the electronic device to read an object having an object identifier in the update list; and delete the object identifier from the update list when the data corresponding to the object is returned to the electronic device.

3. The non-transitory storage medium of claim 1, where the smart card comprises a universal integrated circuit card (UICC).

4. The non-transitory storage medium of claim 1, where the electronic device comprises a card processor.

5. The non-transitory storage medium of claim 4, where the object comprises an object that is modified by an application executed by the card processor.

6. The non-transitory storage medium of claim 4, where the object comprises a file that is modified by an operating system of the card processor.

7. The non-transitory storage medium of claim 1, where the instructions cause the electronic device to: detect that the smart card is newly installed in the electronic device; and when the smart card is newly installed, store object identifiers for all objects stored in the smart card in the update list.

8. The non-transitory storage medium of claim 1, where the instructions cause the electronic device to: detect that the smart card is newly installed in the electronic device; and when the smart card is newly installed, provide a status response to a request to access the update list that indicates that all objects stored in the smart card are to be read.

9. A computer-implemented method executed by an electronic device that includes a memory and a smart card connected to the electronic device, the method comprising:
in response to a boot process that is performed when the electronic device is powered on or restarted, invoking a card read command that is configured to read entire data contents from the smart card for loading into the memory;
in response to the card read command being invoked, controlling the card read command to limit data that is read that is a subset of the entire data contents from the smart card by:
accessing an update list stored on the smart card that indicates objects stored in the smart card have been modified since a previous card read command was invoked;
identifying the objects from the update list that have been modified since the previous card read command was invoked;
executing the card read command to read the objects from the smart card that are identified in the update list without reading the entire data contents from the smart card; and
deleting the objects from the update list after the card read command completes;
in response to determining that a first update or write operation for a first object is included in a first instruction executed by a first component of the smart card, adding an identifier of the first object to the update list; and
in response to determining that a second update or write operation for a second object is included in a second instruction executed by a second component of the smart card, adding an identifier of the second object to a second update list stored on the smart card, wherein the update list is different than the second update list.

10. The method of claim 9, further comprising:
identifying an instruction from the electronic device to read an object having an object identifier in the update list; and
deleting the object identifier from the update list when the data corresponding to the object is returned to the electronic device.

11. The method of claim 9 wherein the update list stored on the smart card includes object identifiers that identify the objects in the update list; and
wherein identifying the objects from the update list includes reading the object identifiers from the update list.

12. The method of claim 9 where the smart card comprises a universal integrated circuit card (UICC).

13. The method of claim 9 where the object comprises an object that is modified by an application executed by the card processor.

14. The method of claim 9 where the object comprises a file that is modified by an operating system of the card processor.

15. The method of claim 9, further comprising:
detecting that the smart card is newly installed in the electronic device; and
when the smart card is newly installed, storing object identifiers for all objects stored in the smart card in the update list.

16. The method of claim 9, further comprising:
detecting that the smart card is newly installed in the terminal; and
when the smart card is newly installed, providing a status response to a request to access the update list that indicates that all objects stored in the smart card are to be read.

17. A memory device, comprising:
electronic card memory configured to store data of a set of objects;
one or more card processors configured to manage access to the electronic card memory; and
monitoring logic configured to cause the one or more card processors to:
identify an update list in the electronic card memory, where the update list indicates which objects have been modified since a first card read command by a terminal that stores a copy of one or more objects in terminal memory;
in response to a second card read command being invoked by the terminal, wherein the second card read command is configured to read entire data contents from the electronic card memory, controlling the second card read command to limit data that is read that is a subset of the entire data contents from the electronic card memory by:
accessing the update list stored on the electronic card memory that indicates objects stored in the electronic card memory have been modified since the first card read command was invoked;
identifying the objects from the update list that have been modified since the first card read command was invoked;
executing the second card read command to read the objects from the electronic card memory that are identified in the update list without reading the entire data contents from the electronic card memory; and deleting the objects from the update list after the second card read command completes;

in response to determining that an update or write operation for a first object is included in a first instruction executed by a component of the memory device, add a first identifier of the first object to the update list; and in response to determining that a read or get operation for a second object is included in a second instruction executed by the component of the memory device, delete a second identifier of the second object from the update list without deleting at least some of the update list.

18. The memory device of claim 17, where the monitoring logic is configured to:

in response to determining that a third update or write operation for a third object is included in a third instruction executed by a second component of the memory device, add a third identifier of the third object to a second update list, wherein the update list is different than the second update list.

19. The memory device of claim 17, where the first object or the second object comprises an object that is modified by an application executed by the card processor.

20. The memory device of claim 17, where the first object or the second object comprises a file that is modified by an operating system of the card processor.

* * * * *

UNITED STATES PATENT AND TRADEMARK OFFICE
CERTIFICATE OF CORRECTION

PATENT NO. : 9,807,595 B2  
APPLICATION NO. : 14/326495  
DATED : October 31, 2017  
INVENTOR(S) : Hans et al.

Page 1 of 1

It is certified that error appears in the above-identified patent and that said Letters Patent is hereby corrected as shown below:

In the Specification

In Column 7, Line 50, delete "NEC" and insert -- NFC --, therefor.

Signed and Sealed this  
Twenty-sixth Day of June, 2018

Andrei Iancu  
*Director of the United States Patent and Trademark Office*